United States Patent
Hong et al.

(10) Patent No.: US 10,096,907 B2
(45) Date of Patent: Oct. 9, 2018

(54) ANTENNA APPARATUS AND METHOD FOR HANDOVER USING THE SAME

(71) Applicant: Electronics and Telecommunications Research Institute, Daejeon (KR)

(72) Inventors: Seung Eun Hong, Daejeon (KR); Moon Sik Lee, Daejeon (KR); Young Seog Song, Daejeon (KR); Jun Hwan Lee, Seoul (KR); Eun Young Choi, Daejeon (KR); Il Gyu Kim, Chungcheongbuk-Do (KR); Seung Chan Bang, Daejeon (KR)

(73) Assignee: Electronics and Telecommunications Research Institute, Daejeon (KR)

( * ) Notice: Subject to any disclaimer, the term of this patent is extended or adjusted under 35 U.S.C. 154(b) by 72 days.

(21) Appl. No.: 15/292,897

(22) Filed: Oct. 13, 2016

(65) Prior Publication Data

US 2017/0033447 A1 Feb. 2, 2017

Related U.S. Application Data

(62) Division of application No. 14/104,377, filed on Dec. 12, 2013, now Pat. No. 9,570,815.

(30) Foreign Application Priority Data

Dec. 12, 2012 (KR) .................. 10-2012-0144151
Dec. 11, 2013 (KR) .................. 10-2013-0153557

(51) Int. Cl.
*H01Q 21/06* (2006.01)
*H01Q 21/20* (2006.01)
(Continued)

(52) U.S. Cl.
CPC .......... *H01Q 21/061* (2013.01); *H01Q 1/246* (2013.01); *H01Q 21/065* (2013.01);
(Continued)

(58) Field of Classification Search
CPC .. H01Q 21/205; H01Q 21/061; H01Q 21/065; H01Q 21/22; H01Q 1/246; H01Q 21/26
See application file for complete search history.

(56) References Cited

U.S. PATENT DOCUMENTS 3,422,436 A * 1/1969 Marston ............... H01Q 3/46
 342/370
3,530,478 A * 9/1970 Mosko ............... H01Q 1/281
 343/708

(Continued)

OTHER PUBLICATIONS

U.S. Appl. No. 14/104,377, filed Dec. 12, 2013, Seung Eun Hong.

*Primary Examiner* — Dameon E Levi
*Assistant Examiner* — Ab Salam Alkassim, Jr.
(74) *Attorney, Agent, or Firm* — William Park & Associates Ltd.

(57) ABSTRACT

There are provided an antenna apparatus and a method of handover using the antenna apparatus. The antenna apparatus may comprise a plurality of antenna elements forming a plurality of beams in a predetermined service area. The plurality of antenna elements are arranged in a plurality of rows, and a number of antenna elements included in an uppermost row of the plurality of rows is smaller than a number of antenna elements included in a downmost row of the plurality of rows, and differences between center angles of beams formed by the antenna elements included in the downmost row are larger than differences between center angles of beams formed by the antenna elements included in the uppermost row.

6 Claims, 7 Drawing Sheets

(51) Int. Cl.
*H01Q 21/26* (2006.01)
*H01Q 1/24* (2006.01)
*H01Q 21/22* (2006.01)
*H04W 16/28* (2009.01)
*H04W 36/00* (2009.01)
*H04B 7/06* (2006.01)

(52) U.S. Cl.
CPC .......... *H01Q 21/205* (2013.01); *H01Q 21/22* (2013.01); *H01Q 21/26* (2013.01); *H04W 16/28* (2013.01); *H04W 36/0072* (2013.01); *H04B 7/0617* (2013.01)

(56) References Cited

U.S. PATENT DOCUMENTS

| | | | | |
|---|---|---|---|---|
| 3,680,137 | A * | 7/1972 | Wright | H01Q 3/242 342/368 |
| 4,101,895 | A * | 7/1978 | Jones, Jr. | H01Q 1/281 343/700 MS |
| 4,162,499 | A * | 7/1979 | Jones, Jr. | H01Q 5/42 343/700 MS |
| 4,980,692 | A * | 12/1990 | Rudish | H01Q 3/40 343/700 MS |
| 5,153,601 | A * | 10/1992 | Milne | H01Q 15/244 333/21 A |
| 5,552,798 | A * | 9/1996 | Dietrich | H01Q 1/288 343/893 |
| 5,650,788 | A * | 7/1997 | Jha | H01Q 1/242 343/700 MS |
| 5,999,145 | A * | 12/1999 | Niekamp | H01Q 1/1242 343/800 |
| 6,173,191 | B1 * | 1/2001 | Jennings, III | H01Q 1/246 455/277.1 |
| 6,388,634 | B1 * | 5/2002 | Ramanujam | H01Q 1/288 343/781 P |
| 6,745,051 | B1 * | 6/2004 | Bassirat | H01Q 1/1242 455/269 |
| 6,870,517 | B1 * | 3/2005 | Anderson | H01Q 1/366 343/702 |
| 6,961,025 | B1 * | 11/2005 | Chethik | H01Q 1/288 343/705 |
| 7,809,403 | B2 * | 10/2010 | Chang | H01Q 1/246 455/431 |
| 8,279,118 | B2 * | 10/2012 | Snow | H01Q 3/24 342/372 |
| 8,918,117 | B2 | 12/2014 | Rochberger et al. | |
| 9,578,684 | B2 * | 2/2017 | Porter | H01Q 21/0056 |
| 9,620,866 | B2 * | 4/2017 | Chang | H01Q 21/205 |
| 9,653,816 | B2 * | 5/2017 | Ferreri | H01Q 21/061 |
| 9,696,419 | B2 * | 7/2017 | Mitchell | G01S 13/66 |
| 9,698,492 | B2 * | 7/2017 | Rao | H01Q 15/244 |
| 9,831,559 | B2 * | 11/2017 | West | H01Q 11/105 |
| 2001/0050634 | A1 * | 12/2001 | Laidig | H01Q 3/242 343/700 MS |
| 2002/0057223 | A1 * | 5/2002 | Hook | H01Q 3/02 343/700 MS |
| 2002/0113743 | A1 * | 8/2002 | Judd | H01Q 1/007 343/757 |
| 2004/0155819 | A1 * | 8/2004 | Martin | H01Q 1/246 343/700 MS |
| 2004/0174303 | A1 * | 9/2004 | Duxbury | H01Q 1/246 343/700 MS |
| 2005/0176385 | A1 | 8/2005 | Stern-Berkowitz et al. | |
| 2005/0176469 | A1 | 8/2005 | Stern-Berkowitz et al. | |
| 2007/0076649 | A1 | 4/2007 | Lin et al. | |
| 2007/0257858 | A1 * | 11/2007 | Liu | H01Q 1/007 343/893 |
| 2008/0055149 | A1 * | 3/2008 | Rees | H01Q 1/28 342/29 |
| 2009/0055293 | A1 * | 2/2009 | Mueller | E21B 17/006 705/28 |
| 2009/0232063 | A1 | 9/2009 | Cordeiro et al. | |
| 2009/0295640 | A1 * | 12/2009 | Shimizu | G01S 3/043 342/417 |
| 2009/0303147 | A1 * | 12/2009 | Choudhury | H01Q 13/0283 343/776 |
| 2009/0312037 | A1 | 12/2009 | Jo et al. | |
| 2010/0066590 | A1 * | 3/2010 | Brown | G01S 7/03 342/147 |
| 2010/0073239 | A1 * | 3/2010 | Tatarnikov | H01Q 1/241 343/700 MS |
| 2010/0141551 | A1 * | 6/2010 | Peng | H01Q 13/08 343/893 |
| 2010/0202308 | A1 | 8/2010 | Gorokhov et al. | |
| 2011/0140965 | A1 * | 6/2011 | Manasson | H01Q 21/061 342/374 |
| 2011/0285582 | A1 * | 11/2011 | Zhang | G01S 7/024 342/26 R |
| 2012/0133549 | A1 * | 5/2012 | Culkin | G01S 13/4463 342/195 |
| 2012/0327516 | A1 * | 12/2012 | Abbaspour-Tamijani | G02B 1/002 359/619 |
| 2014/0162655 | A1 | 6/2014 | Hong et al. | |
| 2015/0122886 | A1 * | 5/2015 | Koch | G06K 7/10356 235/440 |
| 2015/0323658 | A1 * | 11/2015 | Mitchell | G01S 13/02 342/128 |
| 2015/0323659 | A1 * | 11/2015 | Mitchell | G01S 13/9307 342/41 |

* cited by examiner

ANTENNA APPARATUS AND METHOD FOR HANDOVER USING THE SAME

CLAIM FOR PRIORITY

The present application is a divisional of patent application Ser. No. 14/104,377, filed on Dec. 12, 2013; and claims priority to and the benefit of Korean Patent Application No. 10-2012-0144151 filed on Dec. 12, 2012 and Korean Patent Application No. 10-2013-0153557 filed on Dec. 11, 2013 in the Korean Intellectual Property Office (KIPO), the entire contents of each of which are hereby incorporated by reference.

BACKGROUND

1. Technical Field

Example embodiments of the present invention relate to wireless communication technology, and more specifically, to an antenna apparatus capable of minimizing interference between beams and maintaining a wide service coverage, and a method for handover using the same.

2. Related Art

A long term evolution (LTE)-Advanced and a worldwide interoperability for microwave access (WiMAX) currently under way for 4G mobile communication system development are a system that uses a frequency band below 6 GHz, uses a maximum 100 MHz bandwidth in the frequency band, introduces various wireless technology such as 8×8 multiple-input multiple-output (MIMO), carrier aggregation (CA), coordinated multi-point transmission (CoMP), and relay, and tries to secure a maximum transmission capacity of 1 Gbps.

Meanwhile, according to mobile data usage forecasting of wired/wireless service providers including mobile communication carriers and traffic forecasting research organizations, it is expected that the mobile data usage is up to 1000 times as today's data usage in 2020. This is a quiet reasonable prediction when taking into consideration that a mobile data usage rate is gradually changed from conventional voice or text services to video services requiring a higher transmission rate, and a use of smart terminal such as a smartphone and tablet rather than conventional general cellular phones is exponentially increasing.

As described above, as traffic usage exponentially increases and frequency efficiency improvement in a current cellular frequency band meets its limits, a new method of building a cellular network that uses a millimeter-wave (mmWave) frequency band from 10 GHz to 300 GHz in which a wider bandwidth expansion is available is considered.

When the millimeter-wave frequency band is used in mobile communication, it is possible to obtain a wide bandwidth of 1 GHz or more. Moreover, beamforming technology necessary for communication using the millimeter-wave frequency band is applied in addition to directionality that is a physical propagation characteristic of signals having the millimeter-wave frequency band. Therefore, since space resources and wireless resources such as a time, frequency, and code may be used, it is possible to dramatically increase a wireless capacity.

Currently, as examples in which the millimeter-wave frequency band is used in wireless communication, there is a wireless personal area network (WPAN) system having a short range of about 10 m focusing on a 60 GHz frequency band, or a case of point-to-point communication for wireless backhaul in a 70 to 80 GHz band. However, up to now, a use of the millimeter-wave frequency band is limited to a specific field.

When the cellular network (or cellular mobile communication system) using the millimeter-wave frequency band is implemented, it is possible to satisfy explosively growing mobile traffic demands using wide bandwidth frequency resources and space resource recycling. Therefore, it is expected that next-generation application services such as an ultra-definition (UD) image service may be easily provided with high service quality.

However, up to now, since a specific method of building the cellular network using the millimeter-wave frequency band has not been proposed, millimeter-wave frequency band has not been widely used.

For example, since a problem of interference between beams and a problem of service discontinuity due to handover failure during fast movement of terminal may exist when a plurality of beam are formed by using millimeter-wave frequency band, methods for overcoming the above described problems are required.

SUMMARY

Accordingly, example embodiments of the present invention are provided to substantially obviate one or more problems due to limitations and disadvantages of the related art.

Example embodiments of the present invention provide an antenna apparatus capable of minimizing interference between beams.

Example embodiments of the present invention also provide a method for handover using an antenna apparatus capable of preventing service discontinuity due to failures of handover between beams in a cellular communication system providing services by using a plurality of beams.

The present invention is not limited to above example embodiments. Example embodiments not described may be precisely understood by those skilled in the art from the following descriptions.

In some example embodiments, an antenna apparatus may comprise a plurality of antenna elements forming a plurality of beams in a predetermined service area, wherein the plurality of antenna elements are arranged in a plurality of rows, and a number of antenna elements included in an uppermost row of the plurality of rows is smaller than a number of antenna elements included in a downmost row of the plurality of rows, and differences between center angles of beams formed by the antenna elements included in the downmost row are larger than differences between center angles of beams formed by the antenna elements included in the uppermost row.

Here, horizontal beam widths of beams formed by antenna elements included in the same row of the plurality of rows may be configured to be identical.

Here, vertical beam widths of beams formed by antenna elements included in the downmost row may be larger than vertical beam widths of beams formed by antenna elements included in the uppermost row.

Here, a tilt angle of beam formed by each antenna element from horizontal may increase sequentially from the uppermost row to the downmost row.

Here, the apparatus may comprise a first row, a second row, a third row, and a fourth row, and antenna elements included in the first row and the second row may have the same horizontal and vertical beam widths, and antenna elements included in the fourth row may have vertical beam widths larger than vertical beam widths of antenna elements included in antenna elements included in the first and second rows.

Also, differences between center angles of beams formed by antenna elements included in the third row may be larger than differences between center angles of beams formed by antenna elements included in the first and second rows, and differences between center angles of beams formed by the antenna elements included in the third row may be larger than differences between center angles of beams formed by antenna elements included in the fourth row.

In other example embodiments, a method of handover performed in a base station may comprise obtaining information on movement of a terminal, configuring a candidate cooperated beam set (CCBS) for the terminal based on the information on movement of the terminal, and providing information on the candidate cooperated beam set to the terminal.

Here, the method may further comprise being provided with measurement information on the candidate cooperated beam set from the terminal, configuring an active cooperated beam set (ACBS) for the terminal based on the measurement information, and providing configuration information of the active cooperated beam set to the terminal.

Here, the information on movement of the terminal may be obtained based on positional information of the terminal which is included in a predefined message received from the terminal.

Here, the information on movement of the terminal may be obtained by allocating a predetermined physical channel to the terminal, and receiving a predefined signal from the terminal in a predetermined interval through the predetermined physical channel.

In still other example embodiments, a method of handover performed in a terminal may comprise reporting information on movement of the terminal to a base station, receiving information a candidate cooperated beam set (CCBS) corresponding to the information on movement from the base station, and receiving data through beams belonging to the candidate cooperated beam set.

Here, the reporting information on movement may include a step of transmitting a predefined message including information acquired from a global positioning system (GPS).

Here, the reporting information on movement may include a step of transmitting a predefined signal to the base station through a predetermined physical channel allocated by the base station in a predetermined interval.

Here, the method may further comprise performing measurement on beams belonging to the candidate cooperated beam set, transmitting measurement information of the candidate cooperated beam set to the base station, receiving configuration information of an active cooperated beam set (ACBS) corresponding to the measurement information from the base station, and receiving data through beams belonging to the active cooperated beam set.

BRIEF DESCRIPTION OF DRAWINGS

Example embodiments of the present invention will become more apparent by describing in detail example embodiments of the present invention with reference to the accompanying drawings, in which.

Example embodiments of the present invention will become more apparent by describing in detail example embodiments of the present invention with reference to the accompanying drawings, in which.

DESCRIPTION OF EXAMPLE EMBODIMENTS

Figure 1:
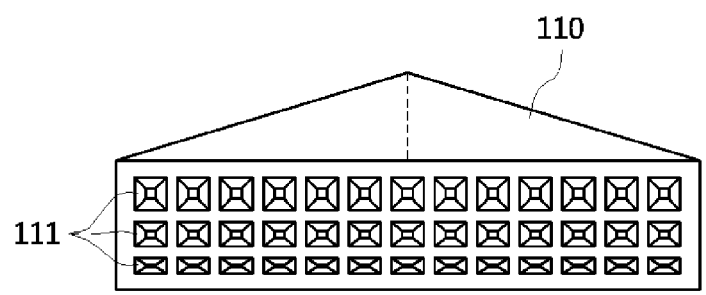
FIGS. 1 and 2 are conceptual diagrams illustrating an example of an antenna applied in a communication system according to an embodiment of the invention.

While the invention can be modified in various ways and take on various alternative forms, specific embodiments thereof are shown in the drawings and described in detail below as examples.

There is no intent to limit the invention to the particular forms disclosed. On the contrary, the invention is to cover all modifications, equivalents, and alternatives falling within the spirit and scope of the appended claims.

The terminology used herein to describe embodiments of the invention is not intended to limit the scope of the invention. The articles "a," "an," and "the" are singular in that they have a single referent; however, the use of the singular form in the present document should not preclude the presence of more than one referent. In other words, elements of the invention referred to in the singular may number one or more, unless the context clearly indicates otherwise. It will be further understood that the terms "comprises," "comprising," "includes," and/or "including," when used herein, specify the presence of stated features, numbers, steps, operations, elements, and/or components, but do not preclude the presence or addition of one or more other features, numbers, steps, operations, elements, components, and/or groups thereof.

Unless otherwise defined, all terms (including technical and scientific terms) used herein are to be interpreted as is customary in the art to which this invention belongs. It will be further understood that terms in common usage should also be interpreted as is customary in the relevant art and not in an idealized or overly formal sense unless expressly so defined herein.

Hereinafter, exemplary embodiments of the invention will be described in detail with reference to the accompanying drawings. Elements that appear in more than one drawing or are mentioned in more than one place in the detailed description will be consistently denoted by the same respective reference numerals and described in detail no more than once.

Embodiments of the invention described below may be supported by standard documents disclosed in at least one of Institute of Electrical and Electronics Engineers (IEEE) 802 system, 3rd generation partnership project (3GPP) system, 3GPP LTE system, and 3GPP2 system, which are wireless access systems. That is, in order to clearly disclose the technological scope of the invention, operations or parts not described in the embodiments of the invention may be supported by the standard documents. Moreover, all terms used herein may be explained by the standard documents.

The term "terminal" used in the present specification may refer to a mobile station (MS), user equipment (UE), machine type communication (MTC) device, mobile terminal (MT), user terminal (UT), wireless terminal, access terminal (AT), subscriber unit, subscriber station (SS), wireless device, wireless communication device, wireless transmit/receive unit (WTRU), mobile node, mobile, or other terminals.

The term "base station" used herein refers to a control device that controls one cell. However, a physical base station in an actual wireless communication system can control a plurality of cells. In this case, the physical base station may include one or more base stations used herein. For example, a parameter that is differently assigned to each cell in this specification will be understood that each base station assigns a different value. The term "base station" may also be referred to as a base station, node-B, eNode-B, base transceiver system (BTS), access point, and transmission point.

Hereinafter, in example embodiments according to the present invention, a technology for constructing a new cellular communication network by using millimeter-wave frequency band (for example, from 10 GHz to 300 GHz) will be provided. However, the technical thought of the present invention is not limed to the millimeter-wave frequency band, and may be also applied to a cellular communication network using conventional cellular communication frequency bands.

In order to build a cellular network using a millimeter-wave frequency band, it is necessary to address a high path loss problem due to a high frequency and a shadowing problem due to radio signal obstructions related to directionality of radio signals, and to efficiently support a mobile station (MS) while a wide service area (coverage) is provided.

In order to overcome a high path loss, that is propagation characteristics of signals having a millimeter-wave frequency band, it is necessary to obtain a high transmitting and receiving antenna gain in consideration of a limited transmitting and receiving power use. This requirement may be regarded as a feature of a communication system using a millimeter-wave frequency differentiated from conventional cellular mobile communication systems.

In general, in order to form a single transmitting/receiving beam, a plurality of antennas are necessary. This is because, as the number of antennas increases, a width of a formed transmitting/receiving beam decreases generally, which results in a high antenna gain.

Meanwhile, since a beam formed by the plurality of antennas delivers a signal only in a predetermined specific direction, in order to transmit the signal toward a wide area, it is necessary to form multiple mutually-different beams and transmit the signal in different directions other than the specific direction. In this case, it is possible to deliver the signal using the same frequency resource at the same time.

When a base station forms a plurality of beams using a plurality of antennas, service capacity which can be provided through the system may be increased as the number of formed beams increases. However, interference between the beams also increases as the number of formed beams increases. Specifically, when a beam is formed in three-dimensional manner, individual beam region may be formed in horizontal and vertical directions. In this case, although more beams can be formed by using antennas capable of forming beam with narrow width, there is a problem that sizes of the antennas increase. Also, although differences between center angles of adjacent beams may be enlarged in order to suppress the interference between beams, coverage holes may be generated in boundary regions of adjacent beams.

Therefore, a system designer should consider a required capacity, a required service coverage, and a installation height of antenna apparatus of the system to design beam widths, differences between center angles of adjacent beams, and arrangement of antennas.

Figure 2:
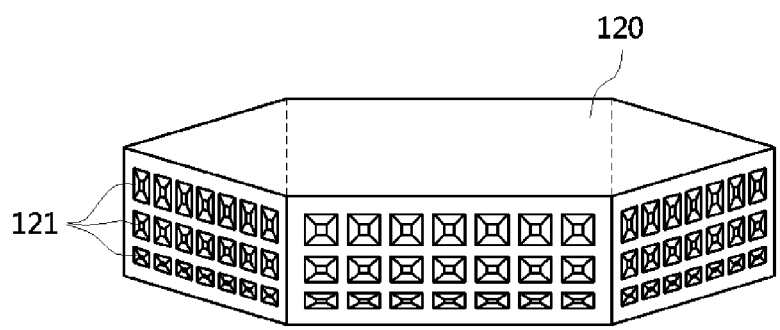

FIGS. 1 and 2 are conceptual diagrams illustrating an example of an antenna applied in a communication system according to an embodiment of the invention.

The antennas illustrated in FIGS. 1 and 2 are designed to overcome a limitation due to characteristics of a signal using the millimeter-wave frequency, and to maximize an advantage of the signal using the millimeter-wave frequency. The antennas may be applied to a base station in a cellular network using the millimeter-wave frequency.

As illustrated in FIGS. 1 and 2, FIG. 1 illustrates a shape of an antenna 110 that includes three surfaces each responsible for 120 degrees and supports all cells. FIG. 2 illustrates a shape of an antenna 120 that includes six surfaces each responsible for 60 degrees and supports all cells.

First, as illustrated in FIG. 1, the antenna 110 according to the embodiment of the invention may have a cross section having a triangular shape, a plurality of antenna elements 111 are provided in each surface, and each surface is responsible for 120 degrees of a service area.

More specifically, the antenna elements 111 configuring each surface may be arranged in rows and columns. For example, as illustrated in FIG. 1, the antenna elements 111 configuring each surface may be arranged in 3 rows and 12 columns and each of the antenna elements 111 may form an individual beam.

Also, the antenna 110 may be configured such that a horizontal beam width and a vertical beam width of the beam formed by each of the antenna elements 111 configuring each surface of the antenna 110 are fixed in a predetermined angle. For example, the horizontal beam width of the beam formed by each antenna element 111 may be fixed at 10 degrees. Moreover, it may be configured such that the vertical beam width of the beam formed by each antenna element 111 has a different angle according to the row in which the antenna element 111 is arranged. For example, the vertical beam width of the beam formed by each antenna element 111 may have 10 degrees for antenna elements included in a first row, 30 degrees for antenna elements included in a second row, and 50 degrees for antenna elements included in a third row from above of each surface.

Therefore, in order for one surface of the antenna 110 to support an area of 120 degrees horizontally, 12 antenna elements provided in each row may be arranged such that a center of a horizontal beam width thereof is respectively separated by 10 degrees.

On the other hand, as illustrated in FIG. 2, the antenna 120 according to another embodiment of the invention has a cross section having a hexagonal shape, and a plurality of antenna elements 121 are provided in each surface thereof, and each surface is responsible for 60 degrees of a service area.

More specifically, the antenna elements 121 configuring each surface may be arranged in 3 rows and 6 columns. Each row includes 6 antenna elements, and each surface includes 18 antenna elements 121 in total. Like the antenna elements 111 illustrated in FIG. 1, a horizontal beam width of a beam formed by each of the antenna elements 121 provided in each row may be fixed at 10 degrees. Further, like the antenna elements 111 illustrated in FIG. 1, a vertical beam width of the beam formed by each of the antenna elements 121 may have 10 degrees for antenna elements included in a first row, 30 degrees for antenna elements included in a second row, and 50 degrees for antenna elements included in a third row from above of each surface.

Here, the horizontal and vertical beam widths of the beam of each antenna element 111 are angles represented based on a half power beam width (HPBW).

In FIGS. 1 and 2, an example in which antenna elements are arranged in three rows and twelve columns for a sector or in three rows and six columns for a sector is illustrated. In the example, for a horizontal beam width and a vertical beam width, a first row has 10 degrees-10 degrees, a second row has 10 degrees-30 degrees, and a third row has 10 degrees-50 degrees.

In a case of antenna configured as illustrated in FIGS. 1 and 2, since interference between adjacent beams among beams formed by antenna elements belonging to the same row becomes severe, low modulation order should be applied even to a center of horizontal and vertical beam width formed by a specific beam so that capacity of system decreases according to use of the low modulation order.

The above described phenomenon is intensified in downward rows of a plurality of rows in the antenna, because beam areas formed by antenna elements included in downward rows are narrower than that beam areas formed by antenna elements included in upward rows, and space between beams formed by antenna elements included in the downward rows is narrow.

The present invention provides an antenna apparatus for solving the above-described problem of interference between beams.

Figure 3:
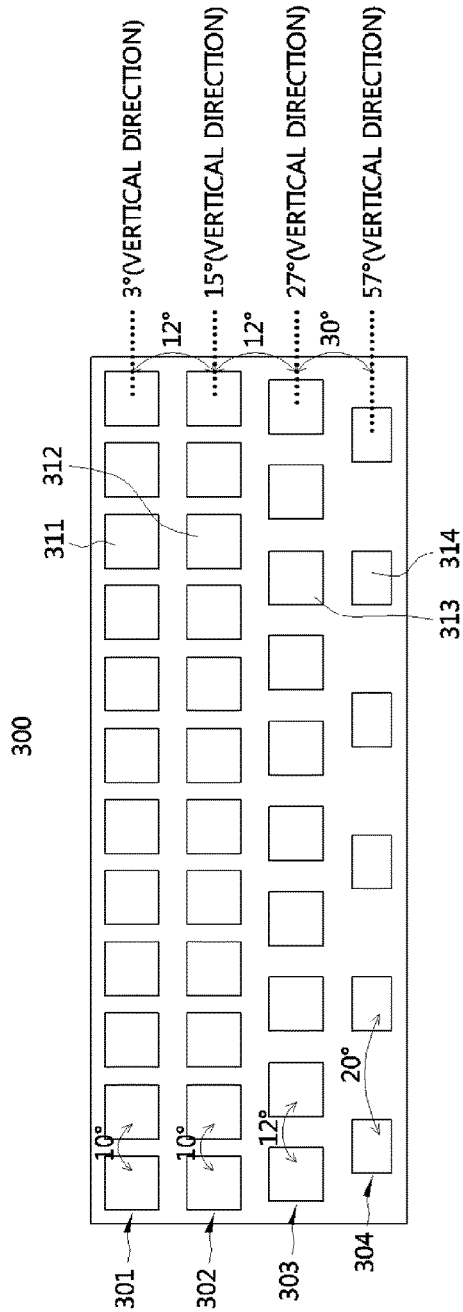
FIG. 3 is a conceptual diagram to explain an arrangement of an antenna apparatus according to an example embodiment of the present invention.
Figure 4:
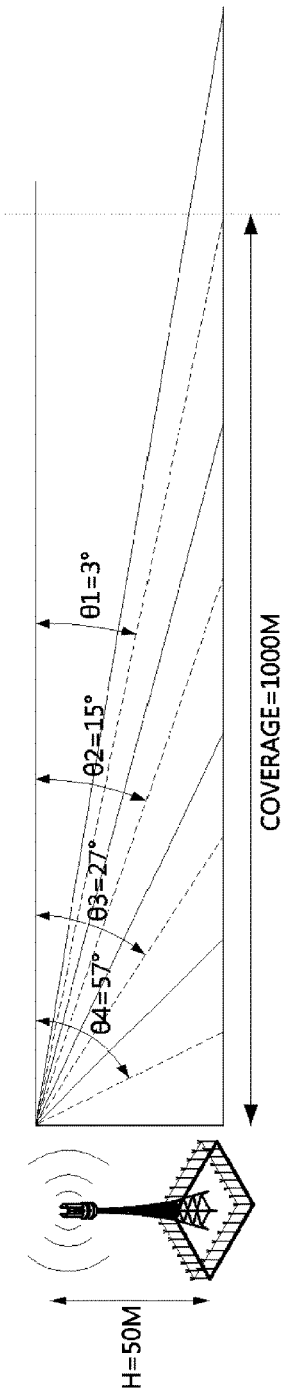
FIG. 4 is a conceptual diagram to explain an arrangement of beams formed by the antenna apparatus.

FIG. 3 is a conceptual diagram to explain an arrangement of an antenna apparatus according to an example embodiment of the present invention. Also, FIG. 4 is a conceptual diagram to explain an arrangement of beams formed by the antenna apparatus illustrated in FIG. 3.

The antenna apparatus according to an example embodiment of the present invention may comprise there surfaces each of which is responsible for a service area of 120 degrees. That is, the antenna apparatus may support three sectors.

Also, each surface of the antenna apparatus 300 may comprise four rows each of which comprises a plurality of antenna elements. Each antenna element included in each row may be configured to form individual beam respectively.

Specifically, in each surface of the antenna apparatus 300, a first row 301 and a second row 302 may comprise 12 antenna elements 311 and 312 for each. Also, a third row 303 may comprise 10 antenna elements 313, and a fourth row 304 may comprise 6 antenna elements 314.

The horizontal-vertical HPBW of each antenna element 311 constituting the first row 301 may be configured to 5 degrees-5 degrees, and differences between center angles of beams formed by the antenna elements 311 in the first row 301 may be configured to 10 degrees. The differences between center angles of beams may mean differences between center angles of beams when all the antenna elements 311 are assumed to be directed to horizontal direction. Also, when it assumed that a height of installed position of the antenna apparatus is 50 meters and a radius of coverage provided by the antenna apparatus is 1000 meters, a center angle of vertical beam of the antenna elements 311 constituting the first row 301 may be tilted 3 degrees from horizontal so that the beam can arrive at a boundary region of the coverage.

The horizontal-vertical HPBW of each antenna element 312 constituting the second row 302 may be configured to 5 degrees-5 degrees, and differences between center angles of beams formed by the antenna elements 312 in the second row 302 may be configured to 10 degrees. Also, a center angle of vertical beam of the antenna elements 312 constituting the second row 302 may be tilted 15 degrees from horizontal. Here, distances between beams formed by the antenna elements 312 of the second row 302 may be smaller than distances between beams formed by the antenna elements 311 of the first row 301. Thus, interference between beams may become more severe in the second row 302 than in the first row 301.

Similarly to the first row 301 and the second row 302, the horizontal-vertical HPBW of each antenna element 313 constituting the third row 303 may be configured to 5 degrees-5 degrees. However, the number of the antenna elements 313 may be 10 smaller than those for the first row 301 and the second row 302. Also, differences between center angles of beams formed by the antenna elements 313 in the third row 303 may be configured to 12 degrees, and a center angle of vertical beam of the antenna elements 313 constituting the third row 303 may be tilted 27 degrees from horizontal. That is, the number of antenna elements 313 constituting the third row 303 is smaller than those of the first and second rows 302 and 303 and differences between center angles of beams formed by the antenna elements 313 are larger than those by the antenna elements 311 and 312. The reason for this is that area of beams formed by the antenna elements 313 of the third row 303 may be smaller than those of the first and second rows since the center angle of vertical beam of the antenna elements 313 constituting the third row 303 may be tilted 27 degrees from horizontal.

The horizontal-vertical HPBW of each antenna element 314 constituting the fourth row 304 may be configured to 5 degrees-20 degrees, and differences between center angles of beams formed by the antenna elements 314 in the fourth row 304 may be configured to 20 degrees. Also, a center angle of vertical beam of the antenna elements 314 constituting the fourth row 304 may be tilted 57 degrees from horizontal.

In the antenna apparatus 300 shown in FIG. 3, the beam formed by each of the antenna elements 111 may also adjust a beamforming direction using an adjustment value (for example, an antenna adjustment parameter) of the antenna 110. Alternatively, a direction of the beam formed by each of the antenna elements 111 may be fixed.

When the direction of the beam formed by each of the antenna elements 111 can be adjusted, it is possible to include an additional digital circuit for adjusting the direction of the beam formed by each of the antenna elements 111. However, when the direction of the beam formed by each of the antenna elements 111 is fixed in a predetermined direction, an additional component for adjusting the direction of the beam is unnecessary so that it is possible to implement the antenna 110 simply. That is, when it is configured such that the direction of the beam formed by each of the antenna elements 111 is fixed, since the additional circuit for adjusting the direction of the beam is unnecessary, it is possible to implement the antenna 110 relatively simply.

In the antenna apparatus 300 according to an example embodiment of the present invention illustrated in FIG. 3 illustrate a configuration that the antenna apparatus 300 has three surfaces each of which is responsible for a coverage of 120 degrees. However, the technological scope of the invention is not limited to exemplified antenna structures in FIG. 3. That is, an overall shape of the antenna, arrangement of antenna elements configuring each surface of the antenna, the number of antenna elements, and the horizontal and vertical beam widths of the beam formed by each of the antenna elements can be variously changed according to an environment in which the antenna is provided.

Moreover, each antenna element illustrated in FIG. 3 may be implemented as an antenna element having various shapes. For example, each antenna element may be implemented as a horn antenna or a patch array antenna (PAA).

Generally, in a cellular communication system forming a plurality of beams, there can be a problem that gain of signals included in the beams degrades in boundary regions of the beams formed by antenna elements, and quality of signals included in the beams degrades due to interference from adjacent beams.

In order to resolve the above described problem, a macro diversity transmission (MDT) method may be used to enhance the quality of signals included in the beams. In the MDT method, signal beams and beams adjacent to the signal beams may be transmitted to a terminal at the same time.

The method of macro diversity transmission may be applied in order to support mobility of a terminal.

Figure 5:
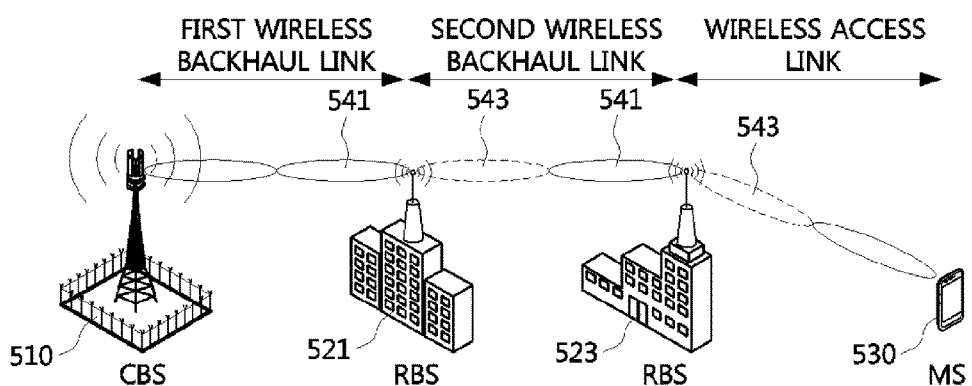
FIG. 5 is a conceptual diagram illustrating a configuration of the communication system according to the embodiment of the invention.

FIG. 5 is a conceptual diagram illustrating a configuration of the communication system according to the embodiment of the invention.

As illustrated in FIG. 5, the communication system using the millimeter-wave frequency band according to the embodiment of the invention may include a central base station (CBS) 510 that performs a function of the base station and at least one relay base station (RBS) 521 and 523 that performs a function of the relay device. A beam is connected using the central base station 510 and the at least one relay base station 521 and 523 so that it is possible to provide a service to a mobile station 530.

As illustrated in FIG. 5, a wireless link between the central base station 510 and the relay base stations 521 or a wireless backhaul link between the central base station 510 and the relay base stations 521 may be formed. Also, a wireless access link between a mobile station 530 and a relay base station or central base station to which the mobile station 230 is directly connected may be formed. Among beams transmitted from each of the relay base stations 521 and 523, a beam in an uplink direction is called a wireless backhaul beam 541, and a beam in a downlink direction is called a wireless access beam 543.

Figure 6:
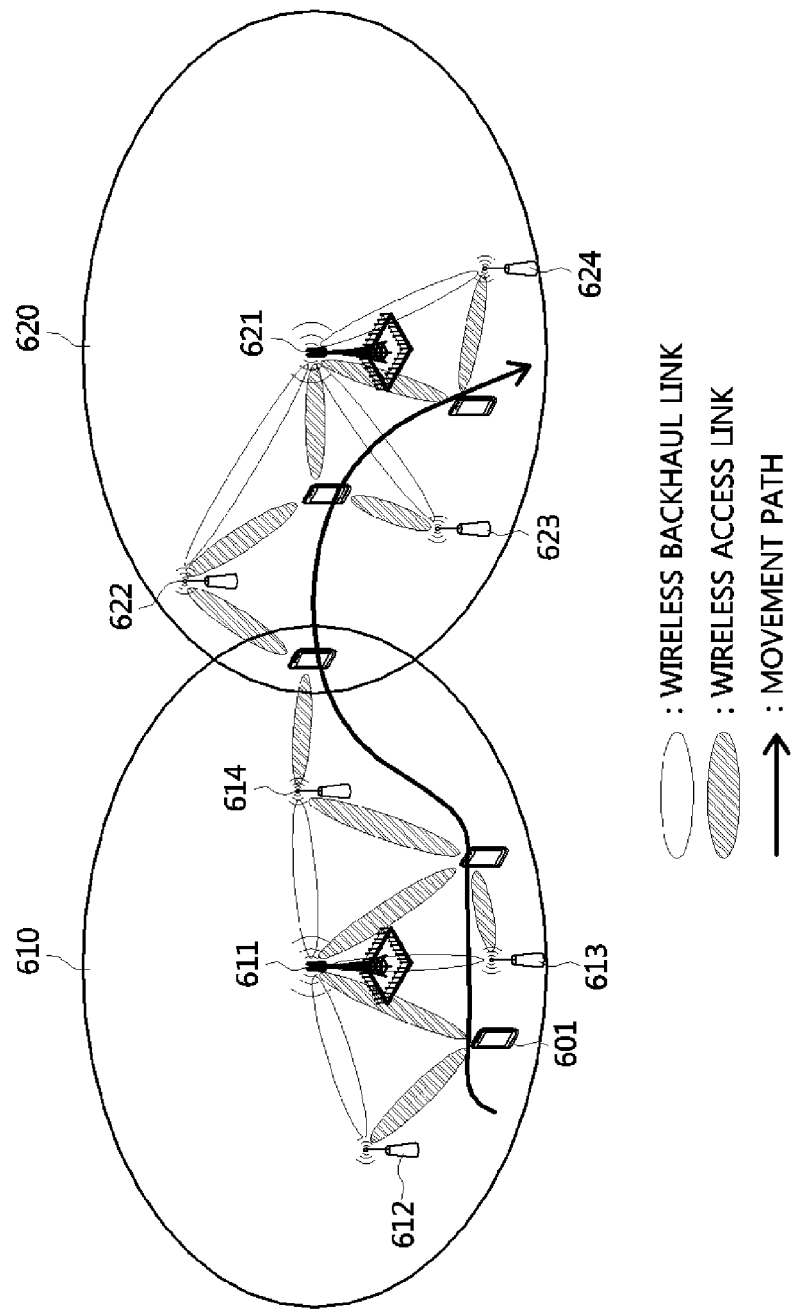
FIG. 6 is a conceptual diagram to explain a method of handover performed in a cellular communication system using millimeter-wave frequency band.

FIG. 6 is a conceptual diagram to explain a method of handover performed in a cellular communication system using millimeter-wave frequency band, and exemplifies a low latency handover-distributed beam system (hereinafter referred to as "LH-DBS") that is technology in which the central and/or relay base stations cooperate, dynamically form multiple beams for the terminal according to a movement path of the terminal, transmit different data or the same data, and handover between beams is available with very low latency (latency is maintained as 0 if possible).

In order to realize LH-DBS technology, multi-flow/inter-site MIMO based on distributed multi-beam should be supported, the terminal should perform a demodulation scheme that supports LH-DBS, and high speed handover (or high speed switching between beams) should be possible. In this case, well-known technology may be used as the demodulation scheme that supports LH-DBS.

In FIG. 6, a first cell 610 includes a first central base station 611 and a plurality of first relay base stations 612, 613, and 614 connected to the first central base station 611 via a wireless backhaul link, and a second cell 620 includes a second central base station 621 and a plurality of second relay base stations 622, 623, and 624 connected to the second central base station 921 via a wireless backhaul link. When a terminal 601 moves along a specific path in the wireless communication system using the millimeter-wave frequency band in which the first and second cells 610 and 620 are adjacently located, LH-DBS operations are illustrated in FIG. 6.

As illustrated in FIG. 6, when the terminal 601 is provided with a service in the first cell 610 and then moves to the second cell 620, the terminal 601 may receive and transmit data via a plurality of wireless access links made by the central base station and/or relay base stations according to a movement path, and available wireless access links (or beams) for the terminal change as the terminal moves.

Hereinafter, an LH-DBS method will be described in detail.

Figure 7:
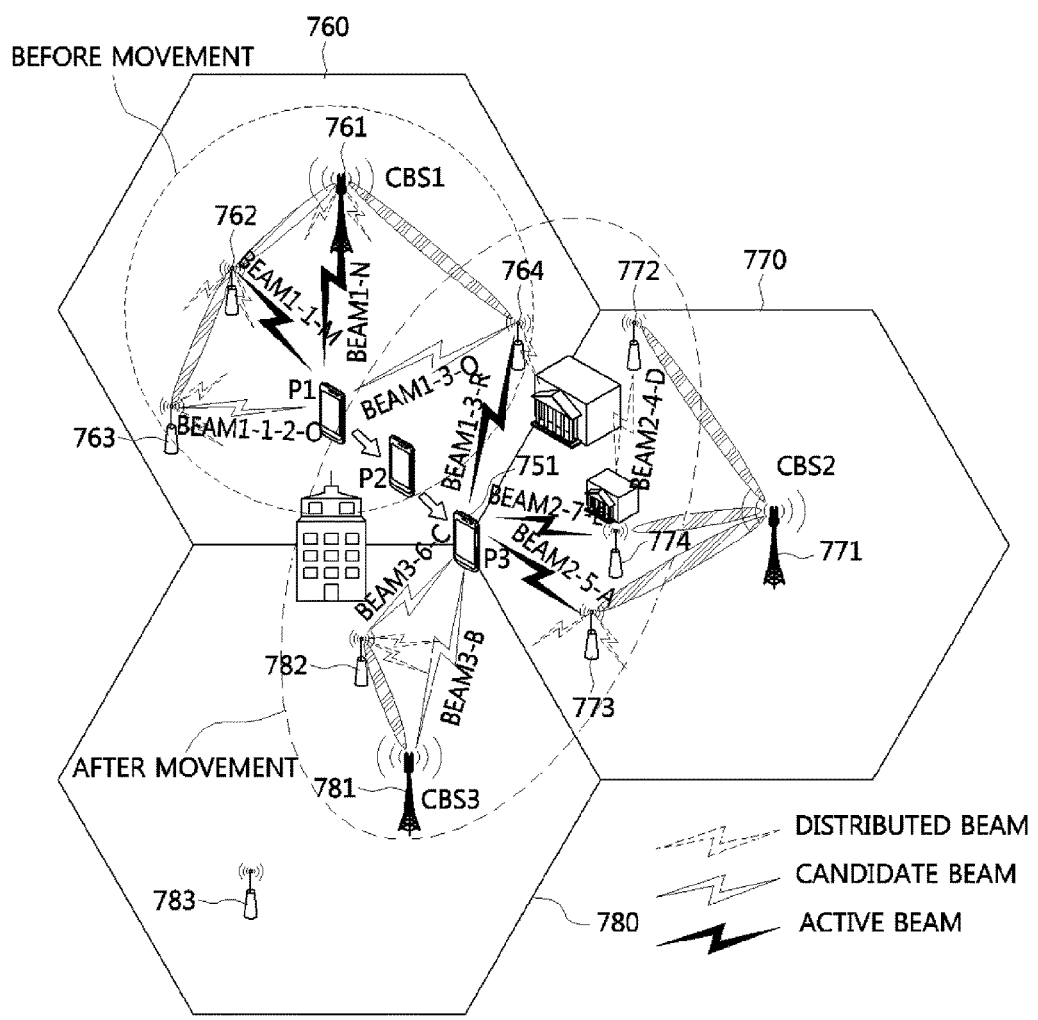
FIG. 7 is a conceptual diagram illustrating the handover method in more detail that is performed in the wireless communication system using the millimeter-wave frequency band according to an example embodiment of the invention.
Figure 8:
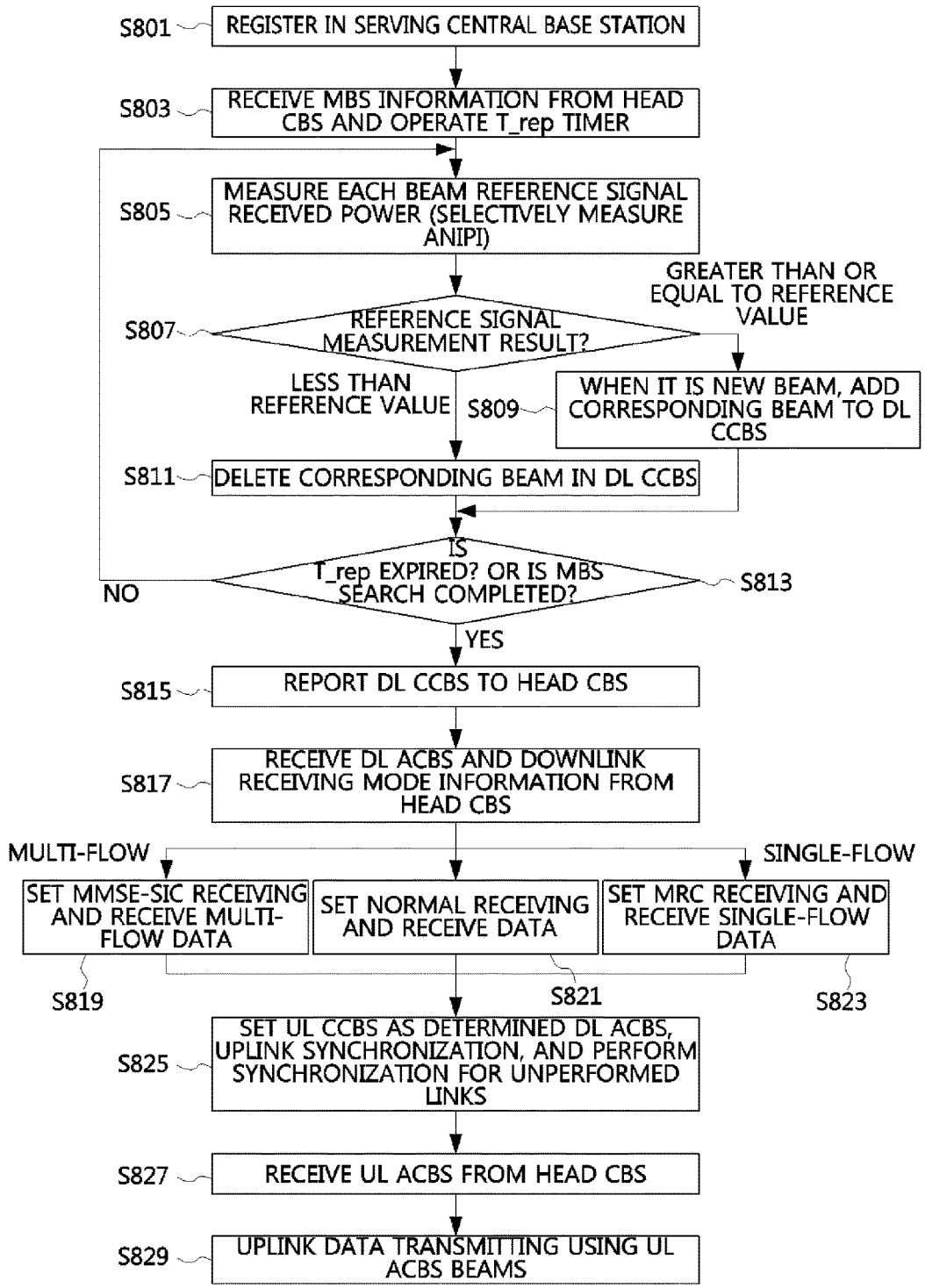
FIG. 8 is a flowchart illustrating the handover method that is performed in the wireless communication system using the millimeter-wave frequency band according to an example embodiment of the invention.

FIG. 7 is a conceptual diagram illustrating the handover method in more detail that is performed in the wireless communication system using the millimeter-wave frequency band according to the embodiment of the invention. FIG. 8 is a flowchart illustrating the handover method that is performed in the wireless communication system using the millimeter-wave frequency band according to the embodiment of the invention.

First, the terms used to explain operations of the LH-DBS method according to the embodiment of the invention will be defined.

A measurement beam set (hereinafter referred to as "MBS") is information that is reported from a head CBS of the terminal to the terminal, and refers to a list of beams formed by adjacent central base station and/or relay base stations based on a place in which the terminal is located. The measurement beam set may be configured by the mobility controller/topology manager of the central base station.

A downlink candidate cooperated beam set (hereinafter referred to as "DL CCBS") refers to a downlink cooperated beam candidate set, and may be a subset of MBS.

A downlink active cooperated beam set (hereinafter referred to as "DL ACBS") refers to a set of beams that transmit data over a downlink according to a predetermined method in LH-DBS, and may be a subset of DL CCBS.

An uplink candidate cooperated beam set (hereinafter referred to as "UL CCBS") refers to an uplink cooperated beam candidate set, may be the same as DL CCBS, and may perform uplink synchronization with corresponding beams.

An uplink active cooperated beam set (hereinafter referred to as "UL ACBS") refers to a set of beams that transmit data over an uplink according to a predetermined method in LH-DBS, may be a subset of UL CCBS, and may refer to a set of beams in which a round-trip time (RTT) value with the terminal is satisfied.

N_RXB is the number of beams that can be received by the terminal at the same time.

N_TXB is the number of beams that can be transmitted from the terminal at the same time.

As illustrated in FIGS. 7 and 8, FIG. 7 exemplifies a logical set of beams for performing an LH-DBS function according to the embodiment of the invention. Candidate beams and active beams are configured before the terminal moves, and the candidate beams and active beams are changed as the terminal moves.

Table 1 shows beam sets according to terminal locations in the cellular network using the millimeter-wave frequency band illustrated in FIG. 7.

TABLE 1

|         | Terminal location (P1) | Terminal location (P2) | Terminal location (P3) |
|---------|------------------------|------------------------|------------------------|
| MBS     | ...                    | ...                    | ...                    |
|         | Beam1-n                | Beam1-n                | Beam1-n                |
|         | Beam1-1-m              | Beam1-1-m              | Beam1-1-m              |
|         | Beam1-1-2-o, ...       | Beam1-1-2-o, ...       | Beam1-1-2-o, ...       |
|         | Beam1-3-q              | Beam1-3-q              | Beam1-3-q              |
|         | Beam1-3-r, ...         | Beam1-3-r, ...         | Beam1-3-r, ...         |
|         | Beam2-7-e              | Beam2-7-e              | Beam2-7-e              |
|         | Beam2-5-a, ...         | Beam2-5-a, ...         | Beam2-5-a, ...         |
|         | Beam3-b                | Beam3-b                | Beam3-b                |
|         | Beam3-6-c              | Beam3-6-c              | Beam3-6-c              |
|         | ...                    | ...                    | ...                    |
| DL CCBS | Beam1-n                | Beam1-n                | Beam1-3-r              |
|         | Beam1-1-m              | Beam1-1-m              | Beam2-7-e              |
|         | Beam1-1-2-o            | Beam1-1-2-o            | Beam2-5-a              |
|         | Beam1-3-q              | Beam1-3-q              | Beam3-b                |
|         |                        | Beam2-5-a              | Beam3-6-c              |
| DL ACBS | Beam1-n                | Beam1-n                | Beam1-3-r              |
|         | Beam1-1-m              | Beam2-5-a              | Beam2-5-a              |
| UL CCBS | DL CCBS                | DL CCBS                | DL CCBS                |
| UL ACBS | DL ACBS                | DL ACBS                | DL ACBS                |
| Head CBS| CBS1(961)              | CBS1(961)              | CBS1(961)              |

As illustrated in FIG. 7, for example, when a terminal 751 is located in a first location P1 within a first cell 760, among candidate beams formed by a central base station (CBS1) 761 and a plurality of relay base stations 762, 763, and 764 in which the first cell 760 is located, the terminal 751 transmits and receives data using DL ACBS (Beam1-n and Beam1-1-m) formed by the central base station 761 and relay base station 762.

Then, when the terminal 751 moves to a second location P2 in the first cell 760, DL ACBS is changed to Beam1-n and Beam2-5-a formed by the central base station 761 and a relay base station 773. Moreover, when the terminal 751 moves from the second location P2 to a third location P3 that is a boundary point of the first cell 760, a second cell 770, and a third cell 780, among a plurality of candidate beams formed by the relay base stations 762, 763, and 764 of the first cell 760, relay base stations 772, 773, and 774 of the second cell 770, and relay base stations 782 and 783 and a central base station 781 of the third cell 780, DL ACBS and UL ACBS used for transmitting and receiving by the terminal 751 are changed to active beams (Beam1-3-r and Beam2-5-a) formed by the relay base station 764 of the first cell 760 and the relay base station 773 of the second cell 770.

Hereinafter, operations in which the LH-DBS function is performed according to the embodiment of the invention will be described with reference to FIGS. 7 and 8. The LH-DBS function illustrated in FIG. 8 will be performed by the terminal provided with a service in the communication system using the millimeter-wave frequency band according to the embodiment of the invention.

First, the terminal 751 registers in the serving central base station 761 (S801). In this case, the terminal 751 may report N_RXB and N_TXB information as specifications of its own transmitting and receiving beams to the serving central base station 761.

In FIGS. 7 and 8, as described above, after the terminal 751 registers in the serving central base station 761, it is assumed that the terminal 751 is provided with a downlink service using one beam (Beam1-n) of the central base station 761 and one beam (Beam1-1-m) of the relay base station 762 as DL ACBS, and that UL ACBS is the same as DL ACBS. Therefore, the central base station 761 serves as the head CBS.

Meanwhile, the terminal may also receive beams (Beam1-1-2-o and Beam1-3-q) from the relay base stations 763 and 764. Therefore, DL CCBS of the terminal may include Beam1-n, Beam1-1-m, Beam1-1-2-o, and Beam1-3-q.

The central base station 761 determines N_RXB reported by the terminal among DL CCBS of the terminal, a link state measured by the terminal, and traffic load states of base stations that form beams included in DL CCBS, and may determine DL ACBS of the terminal.

Meanwhile, there are three modes in which the terminal receives data from beams included in DL ACBS. Specifically, a single-flow cooperated receiving mode in which the same data is received from two or more beams included in DL ACBS, a multi-flow cooperated receiving mode in which different data is received from two or more beams included in DL ACBS, and a general receiving mode used in a case in which one beam is included in DL ACBS.

Here, when DL ACBS is assumed to comprise two beams, the terminal may receive data using the single-flow cooperated receiving mode or multi-flow cooperated receiving mode.

The mobility controller/topology manager of the central base station 761 serving as the head CBS may configure MBS which is information on adjacent beams based on a location of the terminal 751, and report the configured MBS information to the terminal 751 using Beam1-n. Here, the central base station 761 may transmit the MBS information using an arbitrary beam among beams configuring DL ACBS. However, in general, since transmission reliability of a control message may be improved using a modulation and coding scheme (MCS) having high reliability, it is preferable that one beam be selected in terms of resource usage efficiency. One beam that delivers the control message is called a primary beam. While the embodiment of the invention describes an example in which the control message is delivered using the primary beam, the invention is not limited thereto. For example, the control message may be transmitted using beams included in DL ACBS.

As the central base station 761 transmits MBS to the terminal 751 using the primary beam, the terminal 751 receives the MBS information from the central base station 761 (S803).

Based on the MBS information received from the central base station 761, the terminal 751 identifies beams corresponding to MBS by adjusting a weight vector of an antenna. Thus, the terminal 751 measures a preamble or reference signal received power (hereinafter referred to as "RSRP") of each beam with respect to the identified beams and updates DL CCBS (S805). In this case, the terminal 751 may also selectively measure an average noise plus interference power indicator (ANIPI) of wireless resources (for example, a frequency and/or time resource called a resource block (RB)) currently receiving through DL ACBS with respect to a newly added beam in DL CCBS, and may also measure RSRP of a different reference signal in the same direction. In general, mutually orthogonal reference signals are generated for each cell in the cellular network (for example, frequencies in which reference signals are transmitted may be different each other). A reference signal having the highest RSRP measured in one beam direction is a beam that can be added to DL CCBS. When RSRP of another reference signal is measured in the same direction, this signal may be determined as an interference signal source for the beam having the highest RSRP, and is called ANIPI_RS. Interference on the above resource block is called ANIPI_RB.

ANIPI is a parameter to determine how much interference signals exist in a beam to be added, and may be used as reference data when a mobility controller/topology manager of the central base station 761 determines DL ACBS later. That is, as a measured ANIPI is small, link quality is excellent.

While the terminal 751 measures RSRP of MBSs as described above, the terminal also measures RSRP of an existing DL CCBS. Here, based on a measurement result of DL CCBS, the terminal 751 may also delete beams failed to satisfy a predetermined criterion among existing beams from DL CCBS.

More specifically, the terminal 751 measures RSRP (or ANIPI) of beams included in MBS and/or existing DL CCBS, compares a measurement result with a predetermined reference value (S807), and then adds a beam of which RSRP has received power (or ANIPI) greater than or equal to a predetermined reference value to DL CCBS (S809), or deletes beams of which RSRP (or ANIPI) is less than the reference value among beams included in an existing DL CCBS from DL CCBS (S811). While the embodiment of the invention describes an example in which DL CCBS is configured based on the reference value as described above, it is possible to configure DL CCBS by selecting maximum N (here, N is a design parameter) among measured RSRP values.

Meanwhile, whenever DL CCBS is changed, the terminal 751 may report the change to the mobility controller/topology manager of the central base station 761, or the terminal may report according to a predetermined period. Here, when the terminal 751 is configured such that the change of DL CCBS is reported according to the predetermined period, the terminal 751 may determine a report period using a timer (T_rep). That is, in operation S803 of FIG. 8, the terminal 751 operates the timer (T_rep), and then determines whether the timer is expired in operation S813. When it is determined that the timer is expired, the serving central base station 761 may be reported with DL CCBS (S815).

In operation S815, the terminal 751 moving to the third location P3 configures DL CCBS (in FIG. 7, Beam1-3-r, Beam2-5-a, Beam2-7-e, Beam3-b, and Beam3-6-c) based on the RSRP measurement result, and then reports the configured DL CCBS information to the mobility controller/topology manager of the central base station 761 using the primary beam (Beam1-n). At the same time, when a beam is added, it is possible to selectively perform uplink synchronization using the beam.

Meanwhile, the mobility controller/topology manager of the central base station 761 compares the DL CCBS information reported from the terminal 751 and a previously stored DL CCBS, examines a change of DL CCBS, allows a corresponding central base station and/or relay base station to delete resources associated with the terminal 751 with respect to beams deleted in DL CCBS based on an examination result, and queries whether the terminal 751 is accommodated with respect to newly added beams in DL CCBS to the mobility controller/topology manager of a corresponding central base station and/or relay base station.

The central base station 761 extracts beams that can accommodate the terminal 751 from DL CCBS reported from the terminal 751 as described above, configures as many DL ACBS as less than or equal to N_RXB value of the terminal 751 based on reference signal measurement values and ANIPI values of the extracted beams, and then transmits the configured DL ACBS information to the terminal 751. For example, in FIG. 7, DL ACBS may include Beam1-3-r and Beam2-5-a. In this case, Beam1-3-r may be a next primary beam as the terminal 751 moves. The DL ACBS information may be transmitted using only Beam1-n serving as a current primary beam or may also be transmitted using Beam2-5-a to the terminal more safely. In this case, when the primary beam is changed from Beam1-n to Beam1-3-r, the head CBS may also give signaling about the change to the terminal, and report a downlink receiving mode of the terminal.

The terminal 751 receives the DL ACBS information and downlink receiving mode information of the terminal as configured above from the head CBS (S817).

Here, a downlink receiving method of the terminal may be any one of the multi-flow cooperated receiving mode (S819), general receiving mode (S821), and single-flow cooperated receiving mode (S823). The terminal receives downlink data based on received downlink receiving mode information. For example, the terminal performs MMSE-SIC reception setting when the downlink receiving method of the terminal is the multi-flow cooperated receiving mode. When the downlink receiving method of the terminal is the general receiving mode, the terminal performs general data reception setting. When the downlink receiving method of the terminal is the single-flow cooperated receiving mode, the terminal performs MRC reception setting and then receives downlink data.

Meanwhile, the terminal 751 may perform uplink synchronization for DL CCBS beams at any time. Moreover, when the DL ACBS information is received from the central base station, the terminal 751 sets DL CCBS as DL ACBS, and performs uplink synchronization for beams included in DL ACBS preferentially (S825). In this case, when uplink synchronization for DL CCBS is performed first, the terminal 751 may perform synchronization for beams for which uplink synchronization is not performed among beams included in the received DL ACBS.

As described above, when the terminal 751 carries out uplink synchronization, a mobility controller/topology manager of a corresponding central base station and/or relay base station may report round-trip time values obtained by uplink synchronization operations of the terminal 751 to the mobility controller/topology manager of the central base station 761.

The mobility controller/topology manager of the head CBS 761 may determine an optimal UL ACBS from UL CCBS based on the reported round-trip time values as described above and transmit the optimal UL ACBS to the terminal 751 through current DL ACBSs, and the terminal 751 may receive UL ACBS information from the head CBS 761 and update UL ACBS based on the received information (S827). In this case, the UL ACBS may have a value less than or equal to N_TXB reported from the terminal 751.

Then, the terminal may transmit uplink data using beams included in the UL ACBS (S829).

The DL ACBS and UL ACBS as configured above may have the same or different value. In downlink receiving using DL ACBS in the terminal 751, a diversity scheme such as maximal ratio combining (MRC) is used in single-flow cooperated receiving so that a downlink receiving effect having higher reliability may be obtained. In multi-flow cooperated receiving, an interference removing receiver module such as minimum mean square error-successive interference cancellation (MMSE-SIC) is used to effectively receive different data so that receiving frequency efficiency may be improved. Transmission from the terminal 751 using UL ACBS passes different base stations, and receiving efficiency may be improved using various techniques such as selection diversity in the head CBS.

The LH-DBS as illustrated in FIGS. 7 and 8 performs a macro diversity transmission (MDT) using beams belonging to ACBS.

However, when a three dimensional beam is formed in the LH-DBS, area corresponding to each may beam become narrow. Therefore, there can be a problem of service discontinuity since a terminal having a high moving speed may leave area of the beam even before ACBS for the terminal is configured.

In order to resolve the above described service discontinuity problem, a method of handover according to an example embodiment of the present invention may be configured to perform MDT using usable beams (that is, CCBS) among beams adjacent to a beam to be transmitted to a terminal before ACBS for the terminal is configured. Then, the MDT using the CCBS may be continued until the ACBS is configured. After the ACBS is configured, a MDT using the ACBS may be performed.

Here, it is important to configure the CCBS correctly for minimizing resource waste due to performing the MDT. If the central base station responsible for configuring the CCBS knows information on movement of the terminal (for example, movement speed of the terminal, and movement direction of the terminal), beams performing the MDT may be optimized.

Figure 9:
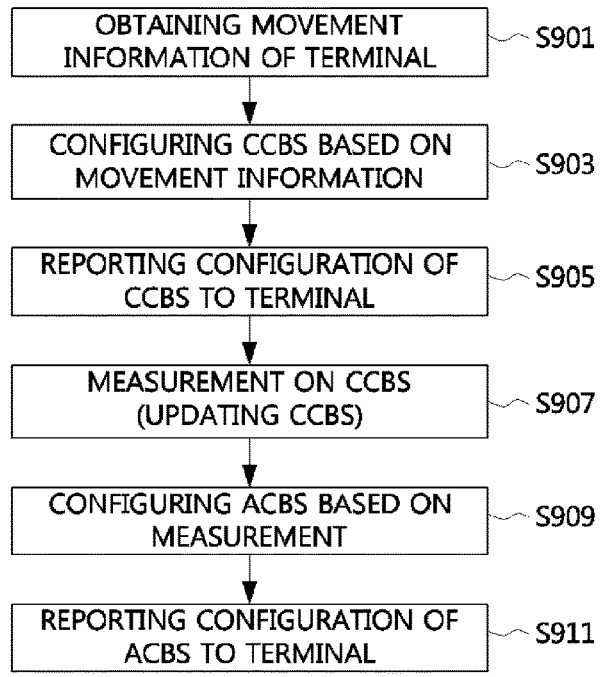
FIG. 9 is a flow chart to illustrate a method of handover performed in a base station according to an example embodiment of the present invention.

FIG. 9 is a flow chart to illustrate a method of handover performed in a base station according to an example embodiment of the present invention.

Referring to FIG. 9, first, a base station may obtain information on movement of a terminal at S901. Here, the information on movement of the terminal may include movement speed and/or movement direction of the terminal. Also, the base station may obtain the information based on positional information of the terminal included in message transferred from the terminal. The positional information may be acquired by a global positioning system (GPS) equipped in the terminal. Alternatively, the base station may receive a predetermined signal from the terminal through a predetermined physical channel, and measure a direction of arrival (DOA) or an arrival time of the received predetermined signal so as to obtain the information on movement of the terminal.

The base station may configure CCBS which will be applied to the terminal based on the obtained information on movement at S903. Here, the base station may configure the CCBS to comprise usable beams among beams formed adjacently to a beam transmitted to the terminal based on the movement speed and direction of the terminal. Alternatively, the base station may configure MBS which will be applied to the terminal based on the information on movement instead of configuring the CCBS.

Then, the base station may report configuration information of the CCBS to the terminal at S905. Alternatively, when the MBS is configured instead of the CCBS at S903, the base station may report configuration information of the MBS to the terminal. Also, the base station may report the configuration information of the CCBS to base stations forming beams included in the CCBS so that the base stations forming beams included in the CCBS may form corresponding beams.

As described above, when the base station configures the CCBS and reports the configuration information of the CCBS to the terminal, the terminal may receive signal through the beams included in the CCBS based on the configuration information of the CCBS received from the base station. Also, the terminal may perform measurements on individual beam included in the CCBS (for example, measurements on power of received preambles or reference signal received power (RSRP) of the individual beam), and report the measure result to the base station.

Alternatively, when the terminal receives the configuration information of the MBS from the base station, as illustrated in FIG. 8, the terminal may search beams belonging to the MBS, update the CCBS by measuring powers of received preambles or received reference signals of the searched beams, and provide information on the updated CCBS to the base station.

The base station may obtain the measurement information (or the information on the update CCBS) from the terminal at S907, and configure ACBS based on the obtained information at S909.

Then, the base station may report configuration information of the ACBS at S911. Here, as illustrated in FIG. 8, the base station may provide information on downlink transmission mode with the configuration information of the ACBS. The terminal may perform downlink reception based on the provided information, and perform uplink synchronization and data transmission through uplink channels.

Figure 10:
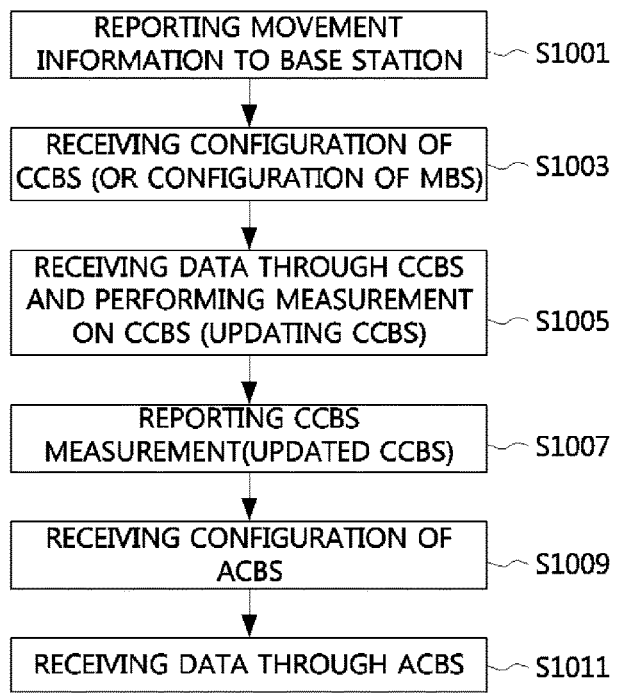
FIG. 10 is a flow chart to illustrate a method of handover performed in a terminal according to an example embodiment of the present invention.

FIG. 10 is a flow chart to illustrate a method of handover performed in a terminal according to an example embodiment of the present invention.

Referring to FIG. 10, first, a terminal may report information on movement of the terminal to a base station at S1001. Here, the information on movement of the terminal may include movement speed and/or movement direction of the terminal. When the terminal comprises a global positioning system (GPS), the terminal may transmit a message including positional information acquired using the GPS to the base station. Alternatively, the terminal may transmit a predetermined signal in a predetermined interval to the base station so that the base station obtains the information on movement of the terminal.

As described above, the base station may obtain the information on movement of the terminal based on the information transferred from the terminal or measurement of the predetermined signal transmitted from the terminal, and configure CCBS which will be applied to the terminal based on the obtained information on movement. Alternatively, the base station may configure MBS which will be applied to the terminal based on the information on movement, and report configuration information of the MBS to the terminal.

The terminal may receive the configuration information of the CCBS (or the configuration information of the MBS) from the base station at S1003, and receive downlink data through beams belonging to the CCBS (or the MBS) at S1005. Here, as illustrated in FIG. 8, the terminal may perform measurements on individual beam included in the CCBS or the MBS (for example, measurements on power of received preambles or reference signal received power (RSRP) of the individual beam), and update the CCBS.

Then, the terminal may report measurement results (or information on the updated CCBS) to the base station at S1007.

As described above, the base station may configure ACBS based on the obtained information, and report configuration information of the ACBS to the terminal. Accordingly, the terminal may receive the configuration information of the ACBS from the base station at S1009.

Then, the terminal may receive downlink data through beams belonging to the ACBS based on the configuration information of the ACBS at S1011. Here, as illustrated in FIG. 8, the terminal may receive information on downlink receiving mode with the configuration information of the ACBS. The terminal may perform downlink reception based on the provided information, and perform uplink synchronization and data transmission through uplink channels.

According to the antenna apparatus and the method of handover using the antenna apparatus as described above, in a cellular communication environment using millimeter-wave frequency band, three dimensional beams may be formed by optimizing arrangement of antenna elements and minimizing interference between beams.

Also, before ACBS for a terminal is configured, CCBS for the terminal is configured in consideration of mobility of the terminal, and services for the terminal are provided to the terminal using the configured CCBS. Then, when the ACBS is configured, services for the terminal are provide to the terminal using the configured ACBS so as to prevent service discontinuity even in the case that the terminal moves at high speed.

While example embodiments of the present invention and their advantages have been described in detail, it should be understood that various changes, substitutions, and alterations may be made to the example embodiments without departing from the scope of the invention as defined by the following claims.

What is claimed is:

1. An antenna apparatus of a base station comprising:
    N planes supporting communication services of the base station in a 360 degree area; and
    a plurality of antenna elements disposed in each of the N planes,
    wherein the N is an integer equal to or more than 3, each of the N planes supports the communication services of the base station in a 360/N degree area, the plurality of antenna elements are arranged in a plurality of rows in each of the N planes, a number of antenna elements included in a downmost row of the plurality of rows is smaller than a number of antenna elements included in an uppermost row of the plurality of rows, differences between center angles of beams formed by the antenna elements included in the downmost row are larger than differences between center angles of beams formed by the antenna elements included in the uppermost row, the beams formed by the antenna elements included in the uppermost row are directed to coverage boundaries of the base station, and beams formed by antenna elements included in remaining rows except for the uppermost row among the plurality of rows are directed to inside of coverage of the base station.

2. The apparatus of the claim 1, wherein horizontal beam widths of beams formed by antenna elements included in the same row of the plurality of rows are configured to be identical.

3. The apparatus of the claim 1, wherein vertical beam widths of beams formed by antenna elements included in the downmost row are larger than vertical beam widths of beams formed by antenna elements included in the uppermost row.

4. The apparatus of the claim 1, wherein a horizontal angle of a beam formed by the antenna elements of each row increases sequentially with each row in a sequence progressing a row at a time from the uppermost row to the downmost row, and the horizontal angle is an angle between a horizontal axis and a direction axis of the beam formed by the antenna elements of each row.

5. The apparatus of the claim 1, wherein the apparatus comprises a first row, a second row, a third row, and a fourth row; antenna elements included in the first row and the second row have the same horizontal and vertical beam widths; and antenna elements included in the fourth row have vertical beam widths larger than vertical beam widths of antenna elements included in antenna elements included in the first and second rows.

6. The apparatus of the claim 5, wherein differences between center angles of beams formed by antenna elements included in the third row are larger than differences between center angles of beams formed by antenna elements included in the first and second rows, and differences between center angles of beams formed by the antenna elements included in the fourth row are larger than differences between center angles of beams formed by antenna elements included in the third row.

* * * * *